United States Patent [19]
Yamazaki et al.

[11] Patent Number: 5,694,165
[45] Date of Patent: Dec. 2, 1997

[54] HIGH DEFINITION IMAGE TAKING APPARATUS HAVING PLURAL IMAGE SENSORS

[75] Inventors: Yasuyuki Yamazaki, Matsudo; Kenichi Shinbori; Tsunefumi Tanaka, both of Yokohama; Shigeo Ogura, Tokyo; Makoto Sekita, Yokohama; Nobuhiro Takeda, Kawasaki; Masashi Hori, Yokohama; Yoshihiro Honma, Asaka; Masato Kosugi, Yokohama; Toshikazu Yanai, Kawasaki, all of Japan

[73] Assignee: Canon Kabushiki Kaisha, Tokyo, Japan

[21] Appl. No.: 734,385

[22] Filed: Oct. 17, 1996

Related U.S. Application Data

[63] Continuation of Ser. No. 326,099, Oct. 19, 1994, abandoned.

[30] Foreign Application Priority Data

Oct. 22, 1993 [JP] Japan .................................. 5-287745
Oct. 22, 1993 [JP] Japan .................................. 5-287747

[51] Int. Cl.$^6$ .................................................. H04N 5/225
[52] U.S. Cl. ........................... 348/218; 348/335; 348/264
[58] Field of Search ...................... 348/218, 264, 348/265, 335, 240, 47, 262

[56] References Cited

U.S. PATENT DOCUMENTS

| | | | |
|---|---|---|---|
| 3,548,087 | 12/1970 | Shimada | 348/262 X |
| 4,323,925 | 4/1982 | Abell et al. | 348/218 |
| 4,765,546 | 8/1988 | Colvoresses | 348/264 X |
| 5,121,152 | 6/1992 | Wagner . | |
| 5,264,694 | 11/1993 | Diehl et al. | 348/264 X |
| 5,374,955 | 12/1994 | Furuhata et al. | 348/264 |
| 5,386,228 | 1/1995 | Okino | 348/218 |

FOREIGN PATENT DOCUMENTS

| | | |
|---|---|---|
| 50-13052 | 5/1975 | Japan . |
| 59-18909 | 5/1984 | Japan . |
| 59-43035 | 10/1984 | Japan . |
| 60-250789 | 12/1985 | Japan . |
| 63-193678 | 8/1988 | Japan . |
| 4-286480 | 10/1992 | Japan . |

*Primary Examiner*—Wendy Garber
*Attorney, Agent, or Firm*—Morgan & Finnegan LLP

[57] ABSTRACT

An image taking apparatus comprising a first optical unit for forming an image, a second optical unit positioned in the vicinity of the image, plural lens units for reforming the image, plural converters positioned at the positions of the reformed optical images and adapted to convert the optical images into electrical signals, and a processor for processing the electrical signals for obtaining an image of high definition.

12 Claims, 12 Drawing Sheets

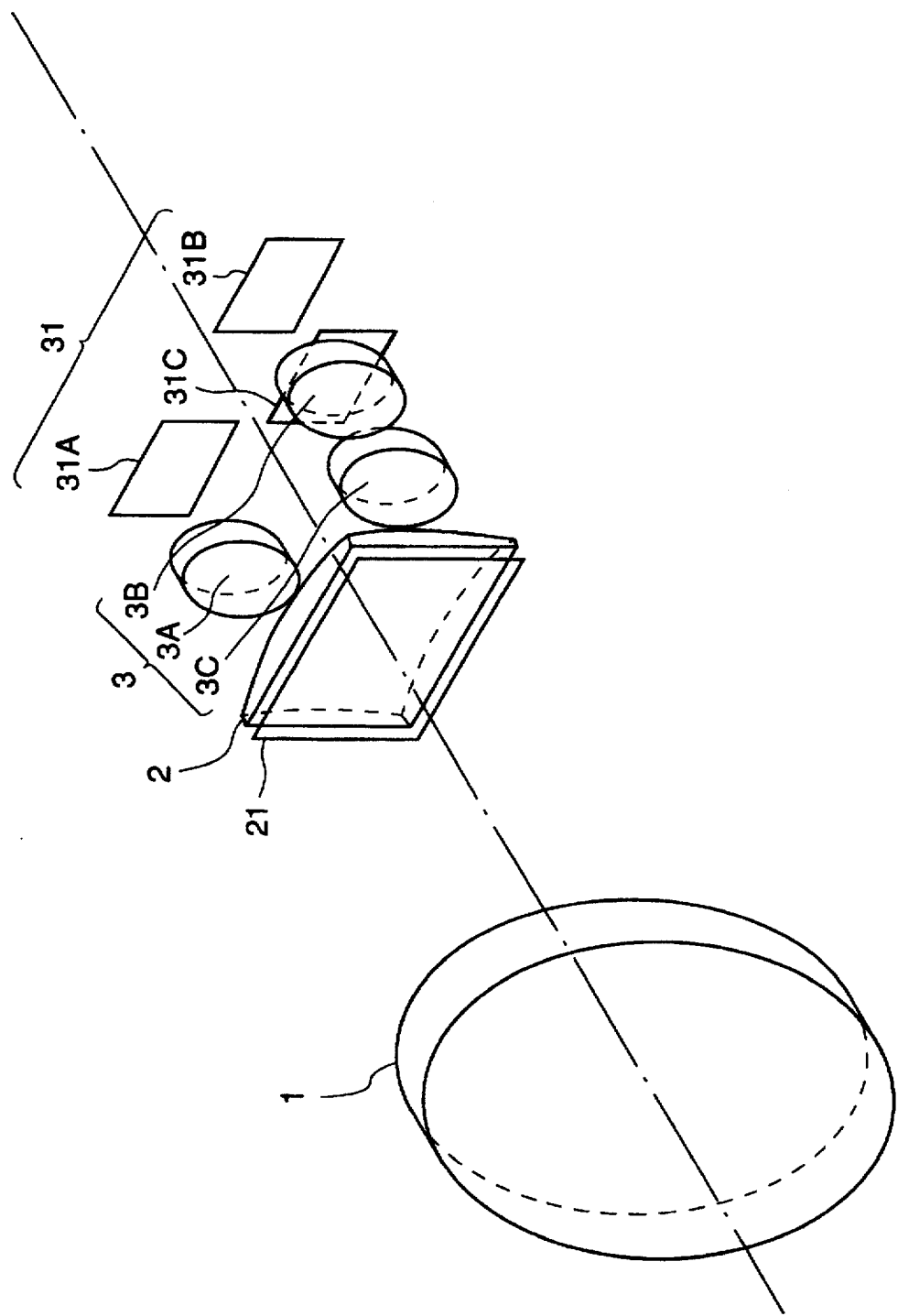

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

31A

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

31B

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

| Ye | Ye | Ye | Ye | Ye | Ye |
|----|----|----|----|----|----|
| Ye | Ye | Ye | Ye | Ye | Ye |
| Ye | Ye | Ye | Ye | Ye | Ye |
| Ye | Ye | Ye | Ye | Ye | Ye |
| Ye | Ye | Ye | Ye | Ye | Ye |
| Ye | Ye | Ye | Ye | Ye | Ye |

31A

| Mg | Mg | Mg | Mg | Mg | Mg |
|----|----|----|----|----|----|
| Mg | Mg | Mg | Mg | Mg | Mg |
| Mg | Mg | Mg | Mg | Mg | Mg |
| Mg | Mg | Mg | Mg | Mg | Mg |
| Mg | Mg | Mg | Mg | Mg | Mg |
| Mg | Mg | Mg | Mg | Mg | Mg |

31B

| Cy | Cy | Cy | Cy | Cy | Cy |
|----|----|----|----|----|----|
| Cy | Cy | Cy | Cy | Cy | Cy |
| Cy | Cy | Cy | Cy | Cy | Cy |
| Cy | Cy | Cy | Cy | Cy | Cy |
| Cy | Cy | Cy | Cy | Cy | Cy |
| Cy | Cy | Cy | Cy | Cy | Cy |

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

31A

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

31B

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

31C

HIGH DEFINITION IMAGE TAKING APPARATUS HAVING PLURAL IMAGE SENSORS

This is a continuation of application Ser. No. 08/326,099, filed on Oct. 19, 1994, now abandoned.

BACKGROUND OF THE INVENTION

1. Field of the Invention

The present invention relates to an image taking apparatus, and more particularly to an image taking apparatus capable of easily providing image information of a high resolving power by utilizing plural image sensor devices of a limited number of pixels, without any particular increase in the number of pixels, and adapted for use in a compact video camera, a still video camera or the like.

2. Related Background Art

The solid-state area sensor (image sensor with two-dimensionally arranged pixels), employed recently as the image pickup device in image taking apparatus such as compact video cameras or still video cameras, have shown remarkable progresses in the increase of number of pixels, in the cost reduction and in the compactization, and are being utilized in various image taking apparatus.

The commercially available image sensor devices generally have about 400,000 pixels, approximately corresponding to the resolving power of the television of present standards, such as NTSC. However, if the image entered by such image sensor device is reproduced on a large-sized image or hard copy, or on computer graphics, the coarseness of the pixels becomes conspicuous, and it is difficult to obtain an image of high definition.

Also solid-state area sensors of about two million pixels for high definition television are recently being developed, but the resolving power with such number of pixels is still insufficient for image input for the display of an ultra-large size. Thus the number of pixels of the current area sensors is insufficient for obtaining the image of higher definition (higher resolving power).

For obtaining an image of a higher resolving power with an image sensor, there is already known a method of increasing the density of pixels thereof and increasing the number of pixels.

However, a reduction in the area of each pixel for increasing the density of pixels generally reduces the signal, thereby deteriorating the S/N ratio. In consideration of this deterioration of the S/N ratio, the number of pixels of two million is already close to the limit, and it is very difficult, in the present technology level, to improve the resolving power by the increase in the number of pixels.

For this reason there have been proposed various methods for improving the resolving power of the image, without increase in the number of pixels, such as those disclosed in the Japanese Patent Publications Nos. 50-13052 and 59-18909, and the method by pixel displacement disclosed in the Japanese Patent Publication No. 59-43035.

In said method of pixel displacement, an optical element for splitting the light beam coming from the object, such as a dichroic prism or a half mirror, is provided at the image side of the image taking optical system, and an image of a higher resolving power is obtained by receiving the light beams split by said optical element, with plural solid-state area sensors positioned with mutual displacement by a half of the pitch of the pixels or less.

Also the Japanese Patent Laid-open Application No. 4-286480 discloses obtaining an image of a higher resolving power by positioning at least an optical path splitting means behind an imaging lens, thereby splitting the image of the object into plural images by said splitting means, forming thus split plural images of the object respectively on plural solid-state area sensors positioned on the image plane and mutually interpolating the area which cannot be taken in respective sensors.

Also the Japanese Patent Laid-open Application No. 63-193678 discloses positioning a wedge-shaped deflecting member in the optical path of an image taking optical system and periodically taking the movement of the image generated by the rotation of said deflecting member with an image sensor, thereby obtaining image information in excess of the number of pixels.

Furthermore, the Japanese Patent Laid-open Application No. 60-250789 discloses obtaining an image of a high resolving power, by separating an image of the object, formed by an image taking optical system, into plural images by a secondary imaging optical system, then forming said separated images respectively on plural image sensors and synthesizing the outputs of said plural image sensors.

For obtaining an image of a high resolving power, the method of pixel displacement is associated with a drawback that the back focus distance of the image taking optical system becomes extremely long, whereby the entire apparatus becomes bulky, because an optical element such as a dichroic prism or a half mirror is positioned at the image plane side of the image taking optical system, in order to split the light beam from the object image. Also such dichroic prism or half mirror is expensive, so that a low cost is difficult to achieve.

Also the method proposed in the Japanese Patent Laid-open Application No. 4-286480 can provide an image of a high resolving power by infinitely splitting the optical path, but the back focus distance of the phototaking lens has to be made extremely long for this purpose, so that the entire apparatus inevitably becomes bulky. For this reason, there can only be employed, in practice, two image sensors or three image sensors at maximum, even in combination with a 3P prism.

Also the method proposed in the Japanese Patent Laid-open Application No. 63-193678 is not suitable for a moving image, and requires an excessively long time for obtaining the output image, since the image of a frame is combined from plural image taking operations.

Furthermore, the method proposed in the Japanese Patent Laid-open Application No. 60-250789 prevents lack of pixels at the boundary portion of the image by slightly displacing a light beam splitting mirror, functioning as the light beam splitting means, from the primary imaging plane, but such configuration is extremely difficult to realize in consideration of the thickness of said light beam splitting mirror and the pupil for the off-axial light beam. Also it is difficult to obtain the image of a high resolving power, since the increase of the number of pixels is twice to three times at maximum.

SUMMARY OF THE INVENTION

The object of the present invention is to provide an image taking apparatus capable of easily providing an image of high definition, by appropriate positioning of plural image sensor devices of a limited number of pixels and of optical elements constituting an image taking optical system for forming the image of the object on said image sensor device, and in particular by positioning at least two of said plural image sensor devices with pixel displacement spatially.

BRIEF DESCRIPTION OF THE DRAWINGS

FIG. 7 is a schematic perspective view of an embodiment 4 of the present invention;

FIGS. 11A, 11B, 12A and 12B are views showing arrangements of color filters provided on the image sensor elements in said embodiment;

FIGS. 14A to 14C, 15A to 15C and 16A to 16C are views showing arrangements of color filters provided on the image sensor elements in said embodiment.

DESCRIPTION OF THE PREFERRED EMBODIMENTS

Figure 1:
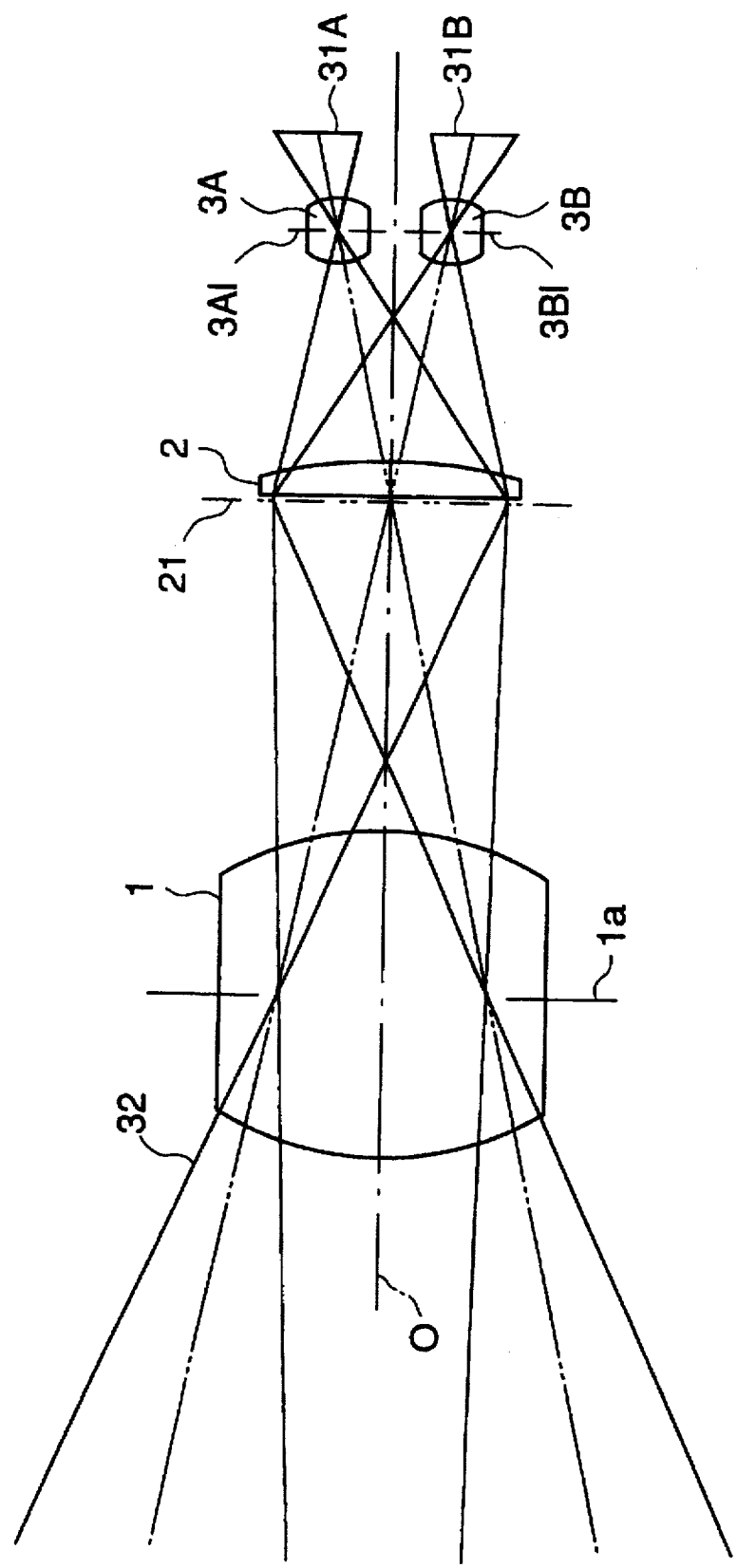
FIG. 1 is a schematic cross-sectional view of an embodiment of the present invention.
Figure 2:
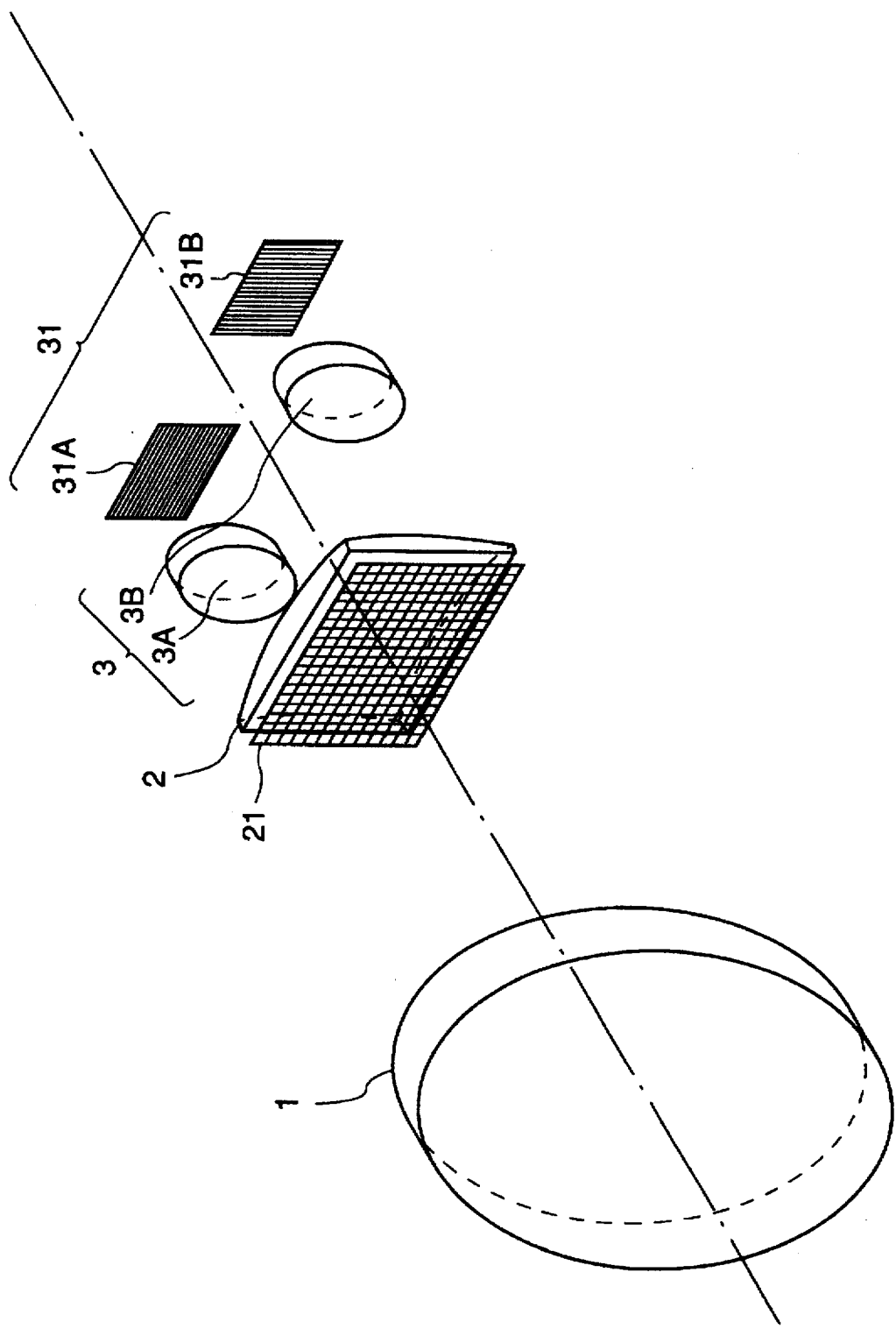
FIG. 2 is a schematic perspective view of an embodiment 1 of the present invention.

FIGS. 1 and 2 are respectively a schematic cross-sectional view and a schematic perspective view of the optical system of an embodiment 1 of the present invention.

A first optical unit 1 focuses an image of the object on a primary imaging plane (anticipated imaging plane) 21.

A second optical unit 2 is positioned in the vicinity of the primary imaging plane 21 on the optical axis O of the first optical unit 1, and condenses and guide the light from the object image, formed on the primary imaging plane 21, to succeeding lens units.

A third optical unit 3 is composed of a lens unit 3A and a lens unit 3B.

Said two lens units 3A, 3B have optical axes outside of the optical axis of the first optical unit 1, and are positioned behind the second optical unit 2, across the optical axis thereof.

Image taking means 31 is composed of two image sensor elements 31A, 31B, composed for example of solid-state area sensors and respectively positioned at the imaging planes of the two lens units 3A, 3B. In the present embodiment, the two image sensor elements 31A, 31B are positioned with spatial pixel displacement as will be explained later.

The two lens units 3A, 3B of the third optical unit reform the entire object image, formed by the first optical unit 1 on the primary imaging plane, onto respectively corresponding image sensor elements 31A, 31B.

In the present embodiment, the second optical unit 2 is so constructed, as indicated by solid-lined optical paths in FIG. 1, that the pupils 3A1, 3B1 of the plural lens units 3A, 3B constituting the third optical unit 3 are focused in the vicinity of the area of pupil 1a of the first optical unit 1.

In the present embodiment, as shown in FIG. 2, the first optical unit 1 forms the object image on the primary imaging plane 21, and the entire object image formed on the primary imaging plane 21 is reformed, by the second optical unit 2 and the two lens units 3A, 3B of the third optical unit 3, respectively onto the image sensor elements 31A, 31B which are positioned with spatial pixel displacement.

Figure 3:
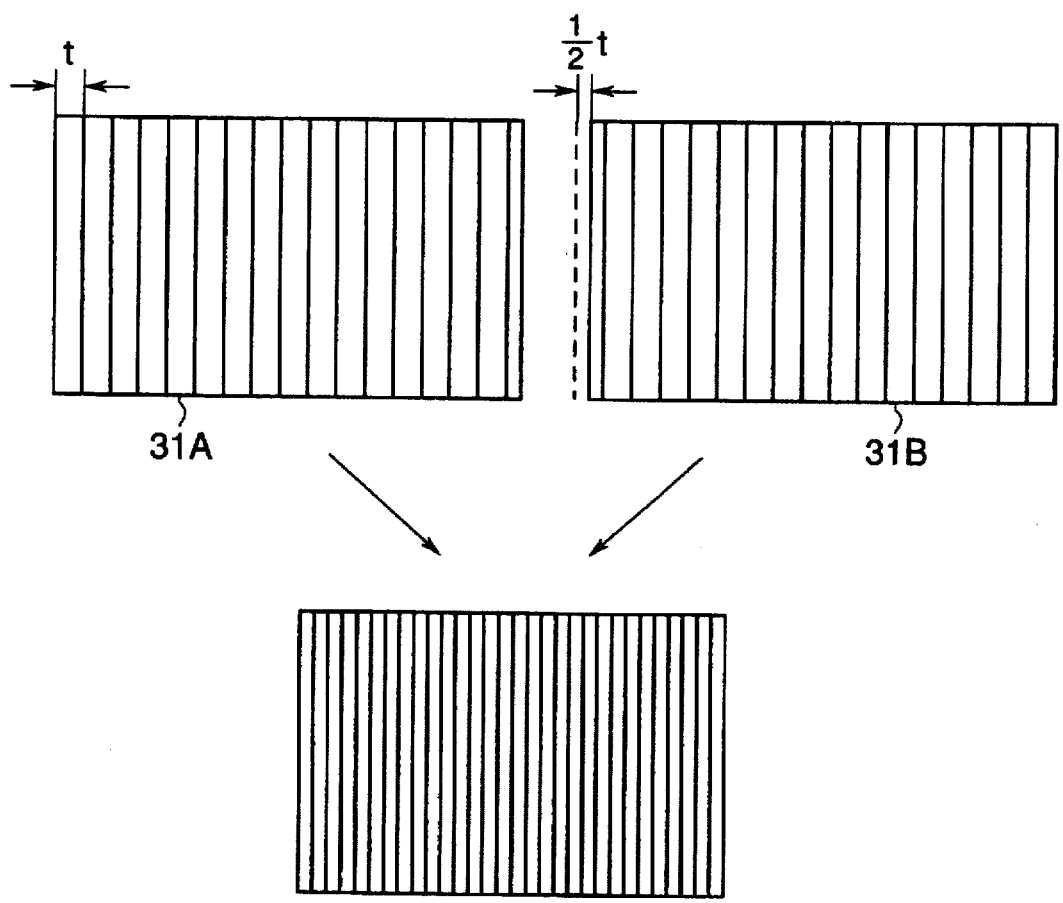
FIG. 3 is a view showing the image combination in the embodiment 1 of the present invention.

FIG. 3 is a schematic view showing the combination of the object images formed on the two image sensor elements 31A, 31B.

In the present embodiment, as shown in FIG. 3, with respect to the position of the image sensor element 31A, the image sensor element 31B is positioned with a pixel displacement by a half of the pixel width t in the horizontal (main scanning) direction, and the images formed on said image sensor elements 31A, 31B are combined by an image combination process circuit (not shown) to double the resolving power in the horizontal direction, thereby obtaining an image of a high resolving power.

The present embodiment thus realizes a resolving power up to the limit resolution of the object image formed by the first optical unit 1, by combining the plural images, formed by the third optical unit 3, by means of the image combination process circuit.

Figure 4:
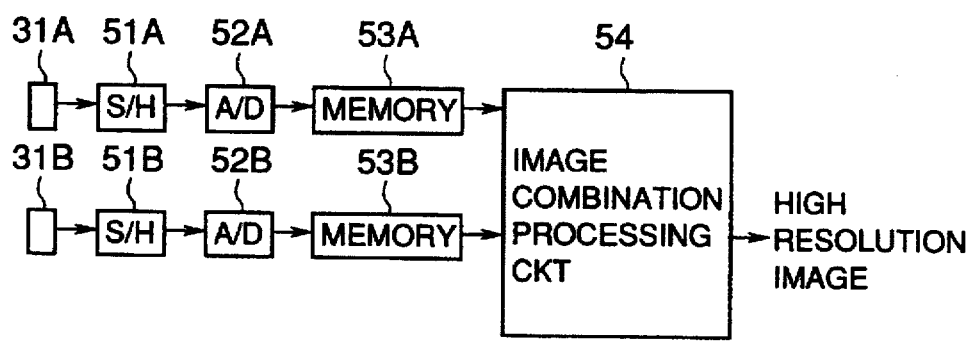
FIG. 4 is a block diagram of a signal processing unit of the embodiment 1 of the present invention.

In the following the image processing method of the present embodiment will be explained with reference to FIG. 4, which is a block diagram of the signal processing unit of the image taking apparatus of the present embodiment.

In the present embodiment, electrical signals from the image sensor elements 31A, 31B are retained in sample-hold (S/H) circuits 51A, 51B, then converted into digital signals by analog-digital (A/D) conversion circuits 52A, 52B, and stored in memory circuits 53A, 53B. Then an image of a high resolving power is obtained by reading the information from the memories 53A, 53B and combining said information in an image combination process circuit 54.

In the present embodiment, in case the image of high resolving power is not required, the object image may be obtained by the image information from one of the image sensor elements constituting the image taking means 31.

Figure 5:
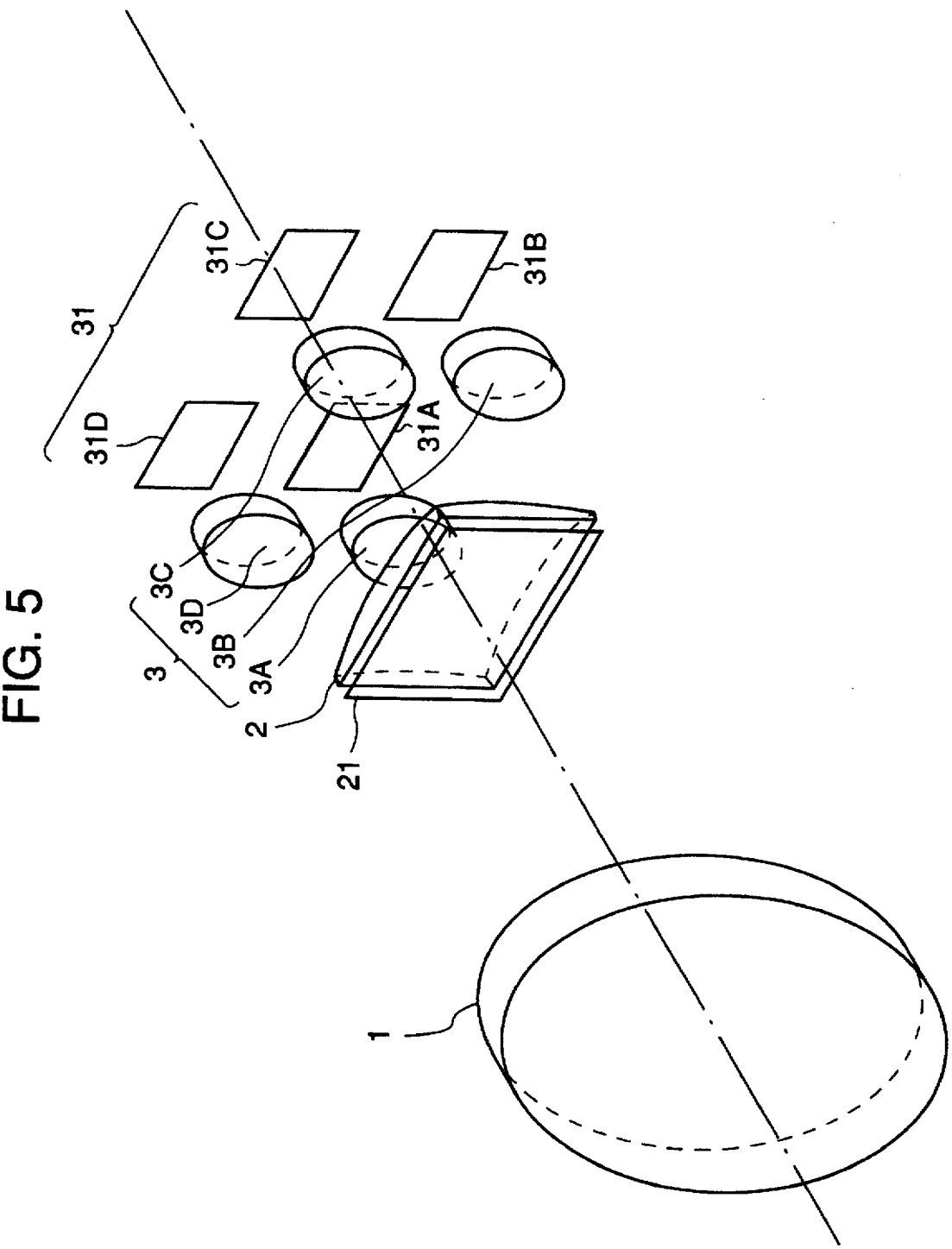
FIG. 5 is a schematic perspective view of an embodiment 2 of the present invention.

FIG. 5 is a schematic perspective view of an embodiment 2 of the present invention, wherein same components as those in FIG. 1 are represented by same numbers.

The present embodiment is different from the foregoing embodiment 1 in that the third optical unit 3 is composed of four lens units 3A, 3B, 3C, 3D, and plural image sensor elements 31A, 31B, 31C, 31D are positioned, with mutual spatial pixel displacement, respectively on the imaging planes of said four lens units 3A, 3B, 3C, 3D, whereby the entire object image, formed on the primary image plane 21, is respectively formed on said plural image sensor elements 31A, 31B, 31C, 31D. Other configurations and optical functions are similar to those in the foregoing embodiment 1.

More specifically, in the present embodiment, the third optical unit 3 is composed of four lens units 3A, 3B, 3C, 3D, and image sensor elements 31A, 31B, 31C, 31D are respectively positioned on the imaging planes of said four lens units 3A, 3B, 3C, 3D. With respect to the position of the image sensor elements 31A, the image sensor element 31B is positioned with a pixel displacement by a half of the pixel width t in the horizontal (main scanning) direction, while the image sensor element 31D is positioned with a displacement by a half of the pixel width t in the vertical (sub scanning) direction. Also the image sensor element 31C is positioned with a displacement by a half of the pixel width t in the horizontal direction with respect to the position of the image sensor element 31D, and with a displacement by a half of the pixel width t in the vertical direction with respect to the position of the image sensor element 31B.

An image of a high resolving power is obtained by combining the image information (output signals) from said image sensor elements 31A, 31B, 31C, 31D in the image combination process circuit (not shown).

Figure 6:
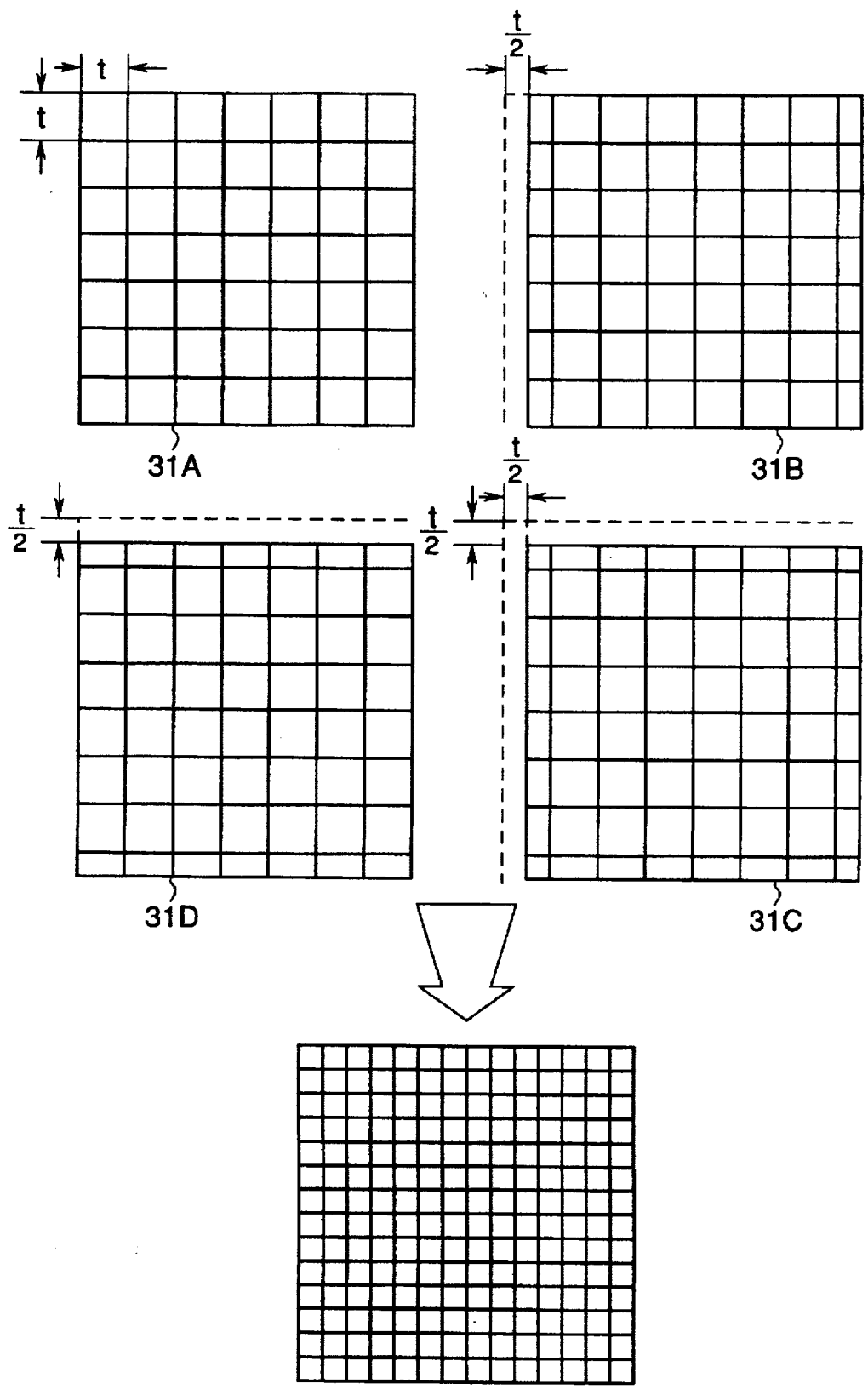
FIG. 6 is a view showing the image combination in the embodiment 2 of the present invention.
Figure 8A:
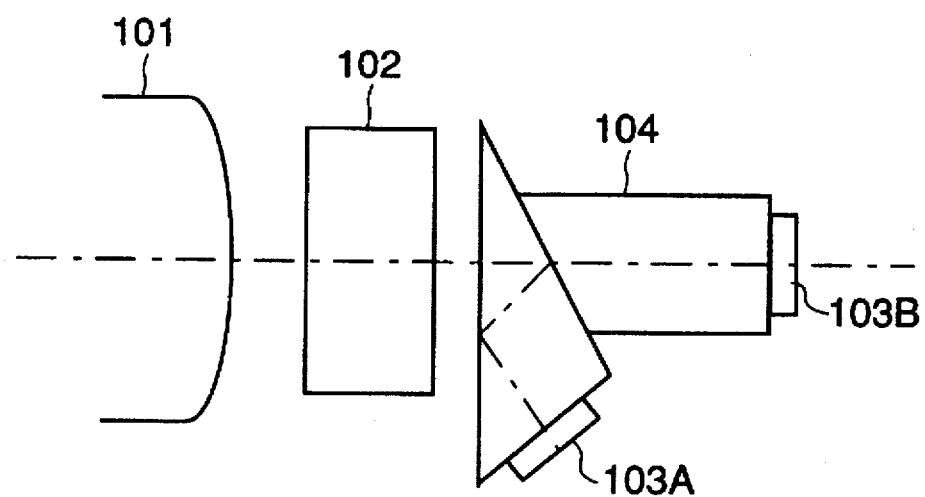
FIGS. 8A and 8B are schematic partial views of conventional image taking apparatus.
Figure 8B:
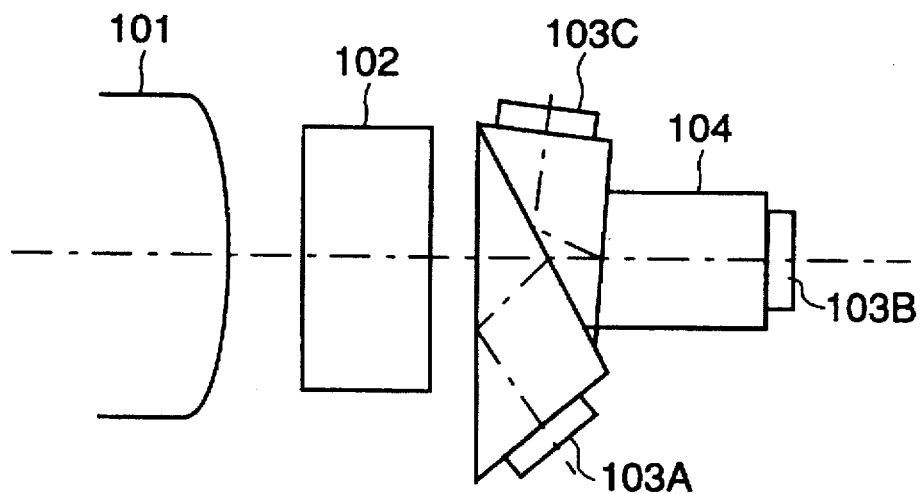

FIG. 6 shows the mode of combination of the image information obtained from said four image sensor elements 31A, 31B, 31C, 31D.

As shown in FIG. 6, the image sensor elements 31B, 31C, 31D are displaced by a half of the pixel width t in the horizontal or vertical direction or in the horizontal and vertical directions, with respect to the position of the image sensor element 31A, as explained in the foregoing. Thus the resolving power of the image, obtained by combining the image information from the image sensor elements 31A, 31B, 31C, 31D is doubled in the horizontal and vertical directions.

In the present embodiment the third optical unit is composed of four lens units, but the resolving power can be further increased by increasing the number of said lens units and the number of corresponding image sensor elements and accordingly reducing the pitch of pixel displacement, whereby an image of higher definition can be obtained.

In the following there will be explained an embodiment 3 of the image taking apparatus of the present invention.

The present embodiment is different from the foregoing embodiment 1 in that the image sensor elements 31A, 31B are provided thereon with color filters, in order to obtain color image signals or a color image. Other configurations and optical functions are similar to those in the embodiment 1.

In the present embodiment, the image sensor element 31A is provided thereon with green (G) filters, while the image sensor element 31B is provided thereon with alternating red (R) and blue (B) filters, whereby color separated green (G), red (R) and blue (B) signals are obtained from the image sensor elements 31A, 31B and are processed in a signal processing circuit to obtain color image signals, whereby a color image of a high resolving power can be obtained.

FIG. 7 is a schematic perspective view of an embodiment 4 of the present invention, wherein same components as those in FIG. 2 are represented by same numbers.

The present embodiment is different from the foregoing embodiment 1 in that the third optical unit 3 is composed of three lens units 3A, 3B, 3C, and three image sensor elements 31A, 31B, 31C are provided, with mutual spatial pixel displacement, respectively on the imaging planes of said three lens units 3A, 3B, 3C, and said image sensor elements 31A, 31B, 31C are respectively provided thereon with color filters. Other configurations and optical functions are similar to those in the embodiment 1.

More specifically, in the present embodiment, the third optical unit 3 is composed of three lens units 3A, 3B, 3C and image sensor elements 31A, 31B, 31C are respectively positioned on the imaging planes of said three lens units 3A, 3B, 3C. The image sensor element 31A is provided thereon, for example, with red (R) filters, while the image sensor element 31B is provided with green (G) filters, and the image sensor element 31C is provided with blue (B) filters. Thus the image sensor elements 31A, 31B, 31C provide color separated green (G), red (R) and blue (B) signals, which are processed in the signal processing circuit to provide color image signals for color reproduction, whereby a color image of high definition can be obtained.

As explained in the foregoing, the present invention can provide an image taking apparatus capable of providing an image of a high resolving power, with the image sensor elements of a limited number of pixels and without restriction on the back focus of the image taking optical system, further capable of achieving a high resolving power through simple image combination, by appropriate positioning of components constituting the image taking apparatus and in particular by positioning at least two of the plural image sensor elements constituting taking means, with pixel displacement spatially.

In the foregoing embodiments, an image of high definition is obtained by mutual displacement of the image sensor elements by a half of the pixel width. In the following there will be explained, with reference to FIG. 9A and subsequent drawings, an embodiment for obtaining an image of high definition by a modification in the color filters.

The basic optical system will not be explained, as it is essentially same as that shown in FIGS. 1 and 2.

Figure 9A:
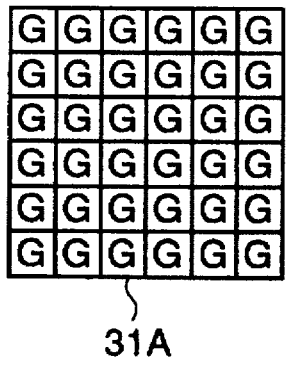
FIGS. 9A and 9B are views showing arrangements of color filters provided on the image sensor elements in the embodiment 1 of the present invention.
Figure 9B:
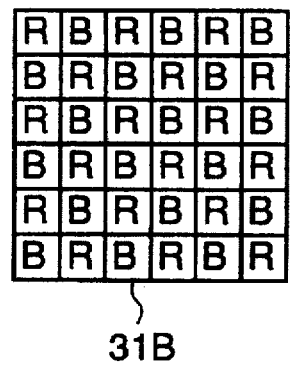

In the present embodiment, the image sensor element 31A is provided thereon with green (G) filters as shown in FIG. 9A, while the image sensor element 31B is provided, as shown in FIG. 9B, with red (R) and blue (B) filters, which alternate in the main scanning (horizontal) direction and in the sub scanning (vertical) direction.

The two lens units 3A, 3B of the third optical unit reforms the entire object image, formed by the first optical unit 1 on the primary imaging plane 21, onto the respectively corresponding image sensor elements 31A, 31B.

In the present embodiment, the second optical unit 2 is so constructed, as indicated by the solid-lined optical paths 32, that the pupils 3A1, 3B1 of the plural lens units 3A, 3B constituting the third optical unit 3 are respectively focused in the vicinity of the pupil area of the first optical unit 1.

In the present embodiment, as shown in FIG. 2, the first optical unit 1 forms the object image on the primary imaging plane 21, and said entire object image, formed on the primary imaging plane 21, is focused through the second optical unit 2 and the two lens units 3A, 3B of the third optical unit 3 respectively onto the image sensor elements 31A, 31B.

The output signals (image information) from said two image sensor elements 31A, 31B are processed by a signal processing unit (not shown) to be explained later, to obtain color image signals for color reproduction.

Figure 10:
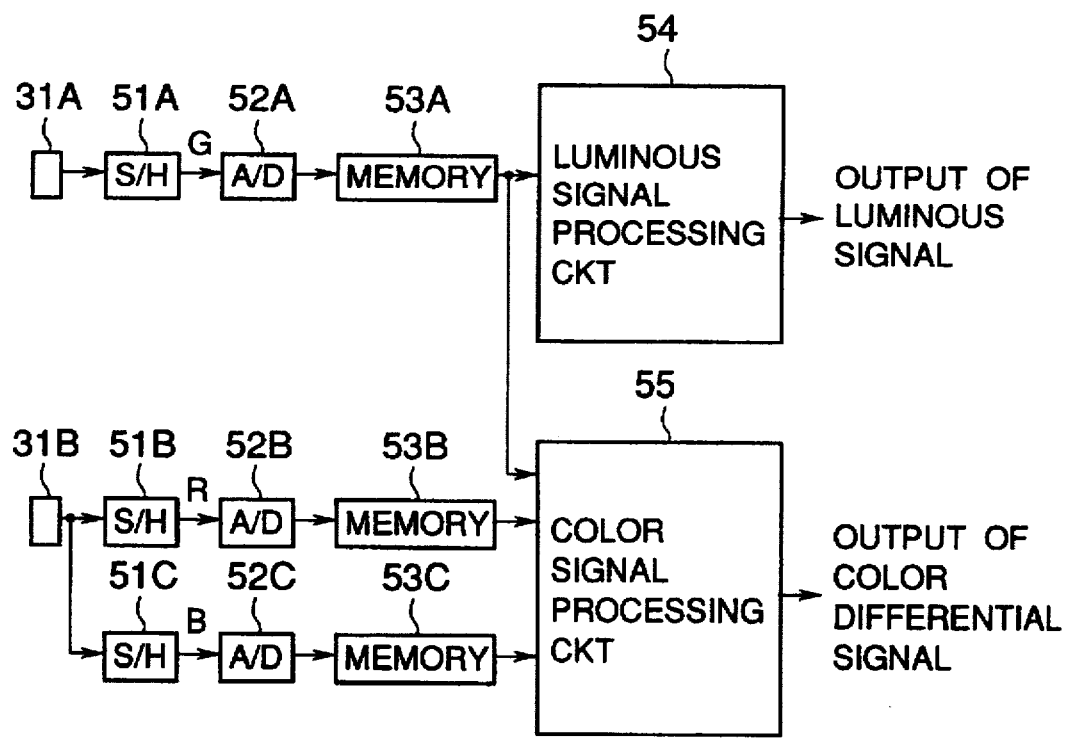
FIG. 10 is a block diagram of a signal processing unit of another embodiment of the present invention.

In the following the image processing method of the present embodiment will be explained with reference to FIG. 10, which is a schematic block diagram of the image signal process unit (signal processing unit) of the image taking apparatus of the present embodiment.

Image sensor elements 31A, 31B are respectively provided thereon with color filters as shown in FIGS. 9A and 9B.

In the present embodiment, the entire object image formed on the image sensor element 31A is released therefrom as electrical signals (G signals), which are retained in a sample-hold (S/H) circuit 51A, then converted into digital signals by an analog-digital (A/D) conversion circuit 52A and stored in a memory circuit 53A.

Also the entire object image formed on the image sensor element 31B is released therefrom as electrical signals (alternating R and B signals), which are retained in sample-hold (S/H) circuits 51B, 51C at the timings of R and B signals, for separating said R and B signals. Then these signals are converted into digital signals by analog-digital (A/D) conversion circuits 52B, 52C and stored in memory circuits 53B, 53C.

The G signals stored in the memory 53A are supplied to a luminance signal process circuit 54 and a color signal process circuit 55. The luminance signal process circuit 54 effects necessary process such as auto gain control (AGC) and gamma control on said G signals, thereby generating luminance signals.

Also the R and B signals, respectively stored in the memories 53B, 53C, are read therefrom and supplied to the color signal process circuit 55.

The color signal process circuit 55 effects processes such as AGC, gamma correction and white balance adjustment on the entered R, G and B signals and generates color difference signals through a matrix process. These signals are used for forming color image signals for color reproduction.

In the present embodiment, the arrangement of the color filters provided on the image sensor elements 31A, 31B is not limited to that shown in FIGS. 9A and 9B, but the present invention is applicable to any filter arrangement, as exemplified by FIGS. 11A and 11B, or FIGS. 12A and 12B, as long as the color image signals can be obtained.

Figures 11A, 11B, 12A, 12B:
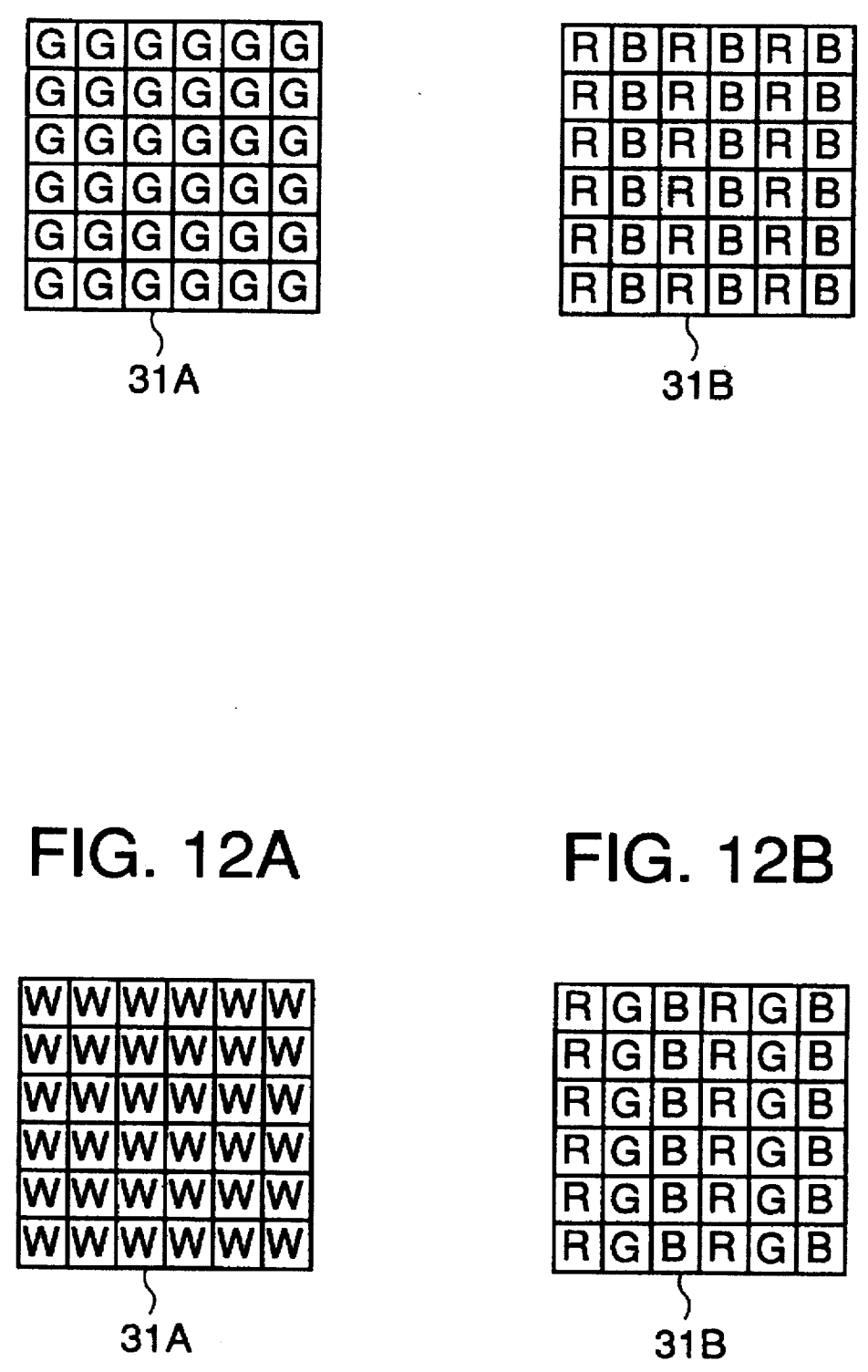

In the arrangement shown in FIGS. 11A and 11B, the image sensor element 31A is provided thereon with green (G) filters, while the image sensor element 31B is provided thereon with red (R) and blue (B) filters which alternate in the main scanning direction. Also in the arrangement shown in FIGS. 12A and 12B, the image sensor element 31A is provided thereon with white (W) filters, while the image sensor element 31B is provided thereon with red (R), green (G) and blue (B) filters, which are cyclically arranged in the main scanning direction.

In particular, in the filter arrangement as shown in FIGS. 12A and 12B, the image can be taken only from the image sensor element 31B in case the image of a high resolving power is not required.

In the present embodiment, by obtaining the color image signals from the output signals (image information) of the two image sensor elements 31A, 31B provided at the imaging planes of the two lens units 3A, 3B of the third optical unit 3, the use of plural image sensors and the formation of color image signals can be achieved without the color separating optical member such as dichroic prisms or half mirrors in the conventional image taking apparatus, whereby the restriction on the back focus or the like of the image taking lens can be eliminated.

Figure 13:
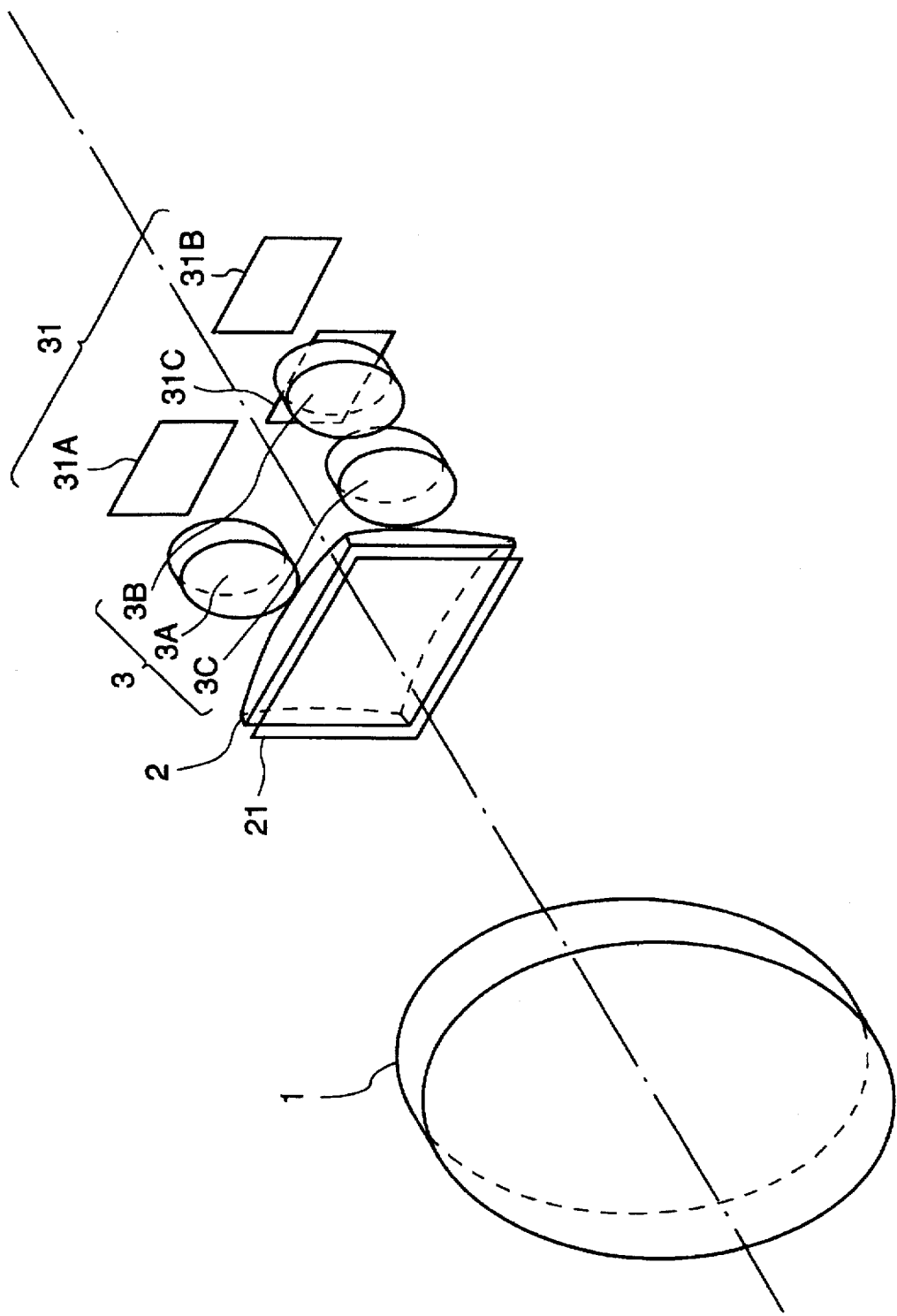
FIG. 13 is a schematic perspective view of another embodiment of the present invention.

FIG. 13 is a schematic perspective view of another embodiment of the present invention, wherein same components as those in FIG. 1 are represented by same numbers.

The present embodiment is different from the foregoing one in that the third optical unit 3 is composed of three lens units 3A, 3B, 3C, and image sensor elements 31A, 31B, 31C are respectively provided on the image planes of said three lens units 3A, 3B, 3C and are provided with color filters of respectively different spectral transmittances. Other configurations and optical functions are similar to those in the foregoing embodiment.

As shown in FIGS. 14A, 14B and 14C, the image sensor element 31A is provided thereon with red (R) filters, while the image sensor element 31B is provided with green (G) filters, and the image sensor element 31C is provided with blue (B) filters. The entire object image, formed by the first optical unit 1 on the primary imaging plane 21, is reformed through the second and third optical units 2, 3 respectively on the image sensor elements 31A, 31B, 31C, and the output signals (image information) therefrom are processed in the signal processing unit (not shown) to obtain color image signals for color reproduction.

In the present embodiment, the arrangement of the color filters provided on the image sensor elements 31A, 31B, 31C is not limited to that shown in FIGS. 14A, 14B and 14C, but the present invention is applicable to any filter arrangement, as exemplified in FIGS. 15A, 15B and 15C, as long as color image signals can be obtained.

In the arrangement shown in FIGS. 15A, 15B and 15C, the image sensor element 31A is provided thereon with yellow (Ye) filters, while the image sensor element 31B is provided with magenta (Ma) filters, and the image sensor element 31C is provided with cyan (Cy) filters, whereby obtained are effects similar to those in the foregoing embodiment.

In the other hand, filters as shown in FIGS. 16A and 16B also can be arranged on each image plane.

The case has been explained in the present embodiments that three image taking elements are arranged at the same position without positioning the three image taking elements with displacement of phase of pixel.

But it goes without saying that an operation as to positioning the image taking elements with displacement of phase of pixel can be employed.

Namely, when an image taking element having filter arrangement as shown in FIGS. 14A, 14B and 14C or FIGS. 15A, 15B and 15C is used, the three image taking elements are arranged by positioning them with displaycement of phase of ⅓ pixel.

When an image taking element having filter arrangement as shown in FIGS. 14A, 14B and 14C is used, the phototaking elements of FIGS. 14A and 14C are arranged at the same position and the phototaking element of FIG. 14B is positioned with displacement of ½ pixel against those of FIGS. 14A and 14C.

When an image taking element having filter arrangement as shown in FIGS. 16A, 16B and 16C is used, the phototaking elements of FIGS. 16A and 16B are arranged at the same position and the phototaking element of FIG. 14C is positioned with displacement of ½ pixel against those of FIGS. 16A and 16B.

Through such constructions, an image having higher resolution can be obtained.

As explained in the foregoing, the present invention can provide an image taking apparatus enabling the use of plural image sensors and the formation of color image signals without the color separating optical members such as dichroic prisms or half mirrors and also capable of easily providing a color image of a high resolving power with image sensor elements of a limited number of pixels and without restriction on the back focus or the like of the image taking optical system, by appropriately positioning the components of the image taking apparatus and providing color filters of mutually different spectral transmittances respectively on the image sensor elements positioned on the imaging planes of the plural lens units constituting the third optical unit.

What is claimed is:

1. An image taking apparatus comprising:

a first lens unit for forming an image, said first lens having an optical axis;

a second lens unit disposed in the vicinity of said image;

plural lens units for reforming said image, each of the plural lens units forms an image of mutually the same color component, said plural lens units having respective optical axes, none of which are common to said optical axis of said first lens unit;

plural conversion means disposed at the positions of thus reformed optical images and adapted to convert the reformed optical images into electrical signals; and process means for processing said electrical signals for obtaining an image of high definition.

2. An image taking apparatus according to claim 1, wherein pixels of one of the conversion means and those of another of the conversion means are spatially aberrated by a half pixel.

3. An image taking apparatus according to claim 1, wherein said plural lens units are adapted to respectively reform the image of a same area.

4. An image taking apparatus according to claim 1, Wherein each of said conversion means includes an area sensor.

5. An image taking apparatus according to claim 4, wherein color filters of mutually different spectral characteristics are disposed on the light-receiving surfaces of at least two of said conversion means.

6. An image taking apparatus for taking an image formed by an objective oriented on an optical axis, comprising:

plural lens units for reforming said image, said plural lens units having respective optical axes, none of which are common to said optical axis of said objective;

plural area sensors for converting plural optical images, reformed by said lens units into electrical signals; and process means processing said electrical signals for obtaining an image of high definition.

7. An image taking apparatus according to claim 6, further comprising process means for processing said electrical signals for obtaining an image of high definition.

8. An image taking apparatus according to claim 7, wherein said process means employs a process for combining said electrical signals.

9. An image taking apparatus according to claim 6, wherein color filters of respectively different spectral characteristics are disposed on the front faces of at least two of said plural area sensors.

10. An image taking apparatus according to claim 6, wherein said area sensors are mutually aberrated spatially by a half pixel.

11. An image taking apparatus according to claim 1, wherein a single conversion means is spatially displaced by a predetermined amount from another single conversion means.

12. An image taking apparatus according to claim 6, wherein a single conversion means is spatially displaced by a predetermined amount from another single conversion means.

* * * * *